(No Model.)  J. F. McLAUGHLIN.  2 Sheets—Sheet 1.
BOGIE TRUCK MOTOR CAR.
No. 593,599.  Patented Nov. 16, 1897.
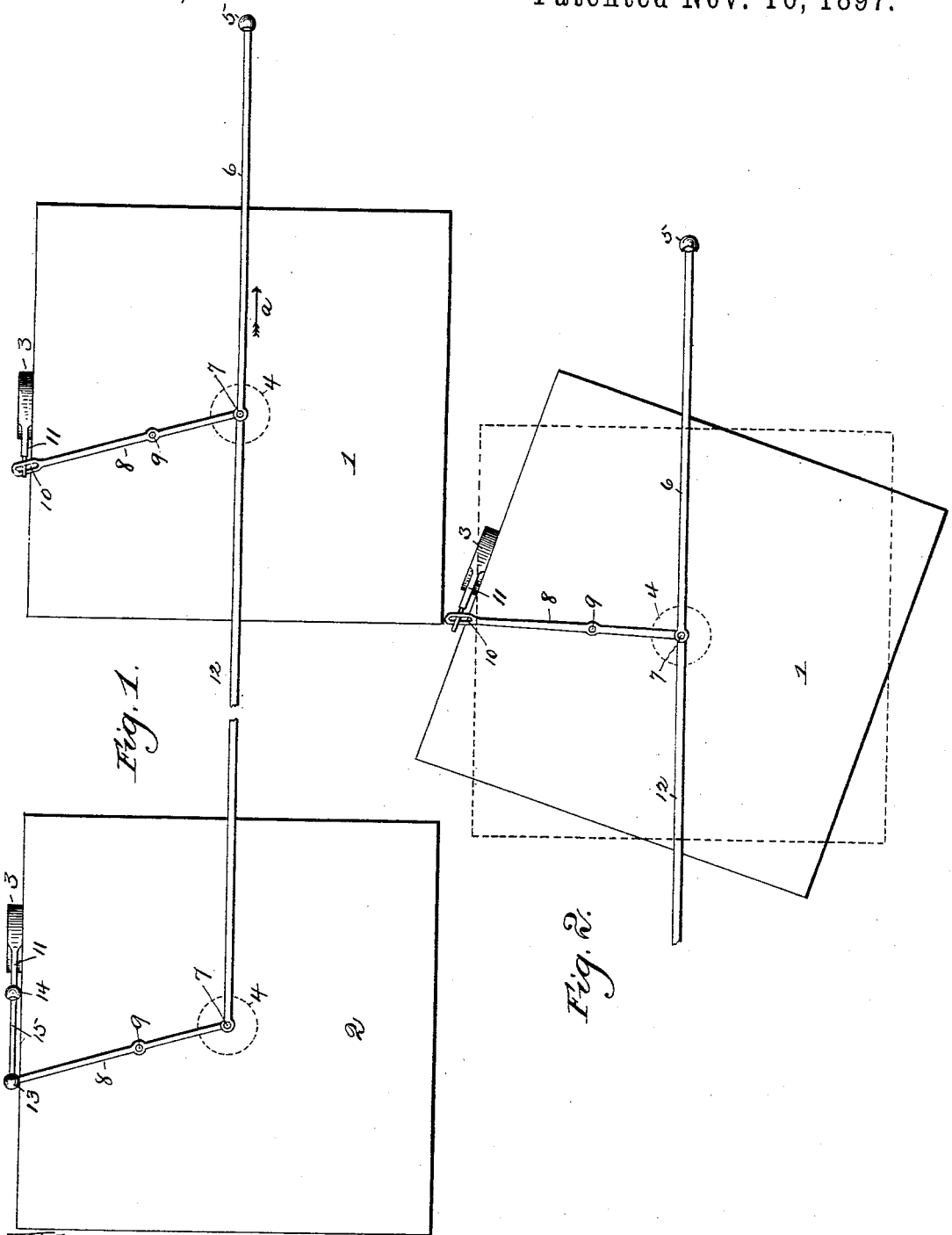
Witnesses:
J. B. McGirr.
F. T. Chapman.
Inventor,
James F. McLaughlin,
By Joseph Lyons,
Attorney.

(No Model.) 2 Sheets—Sheet 2.
J. F. McLAUGHLIN.
BOGIE TRUCK MOTOR CAR.
No. 593,599. Patented Nov. 16, 1897.
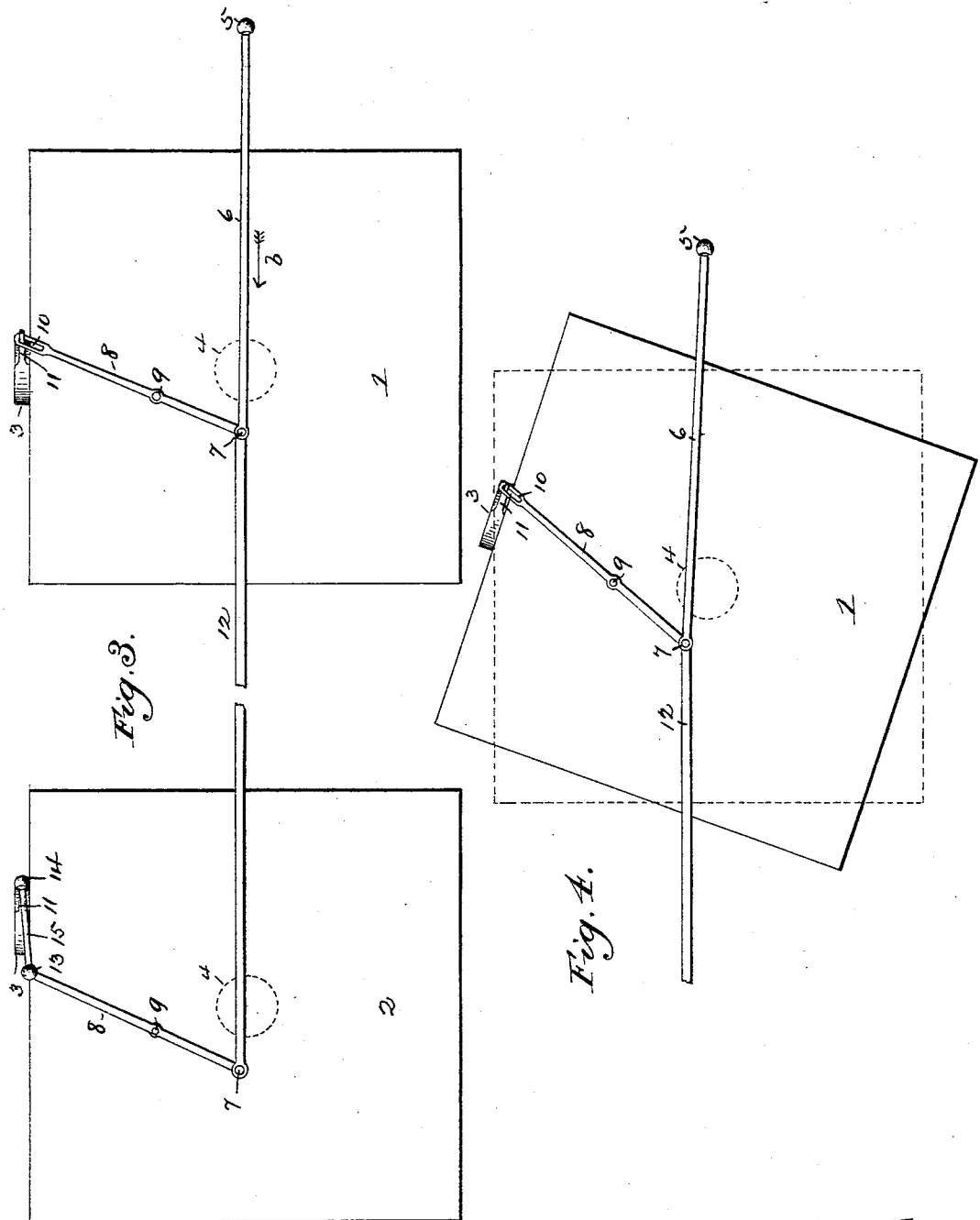
Witnesses:
J.B. McGirr.
F. T. Chapman
Inventor,
James F. McLaughlin,
By Joseph Lyons
Attorney.

United States Patent Office.

JAMES F. McLAUGHLIN, OF PHILADELPHIA, PENNSYLVANIA.

BOGIE-TRUCK MOTOR-CAR.

SPECIFICATION forming part of Letters Patent No. 593,599, dated November 16, 1897.

Application filed November 18, 1891. Serial No. 412,307. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Bogie-Truck Motor-Cars, of which the following is a specification.

My invention has reference to improvements in mechanism for operating friction-clutches arranged for connecting electric and other motors with and disconnecting the same from the driving-axles of street-cars and other railway vehicles when these cars or vehicles are mounted upon pivoted trucks, the object of the invention being to operate the clutches from a single point simultaneously and to so arrange the connection between the clutches and the operating-lever as to render the operation equally certain whether the car runs upon a straight rail or whether it runs upon a curve.

In my Letters Patent No. 424,810, granted to me on April 1, 1890, I have shown an electric-motor car in which the electric motors are connected with and disconnected from the driving-axles by means of friction-clutches, which are under the control of the motorman; but in the invention there shown each clutch is controlled by an independent operating-lever. For the successful operation of electric-motor cars it is desirable to use two pivoted trucks on cars of considerable length, and for economical reasons cars are now built of great length, and the curves of the road are necessarily made upon as short a radius as is admissible in view of the high speed with which the cars must be run in order to satisfy the demands of the public. In such cases it is imperative that the cars be mounted upon pivoted trucks which are a considerable distance apart, preferably, one near each end of the car, and if such cars are operated by electric motors it has been found necessary that there should be an electric motor for each truck. If such car comes upon a curve of the road, each truck turns independently of the other and both trucks turn with reference to the car, and if the connections between the clutches and the operating-levers were of the kind heretofore used on cars with fixed trucks the operative relation between the clutches and motors would be changed—that is to say, the clutches would be turned to be "off" when they should be "on" or they would be turned "on" when they should be "off," or they would be turned "on" with an excessive strain to the injury of the structure. This would be the case even if each clutch were controlled by a separate operating mechanism, but it would be the case in a still higher degree if it were attempted to actuate two or more clutches by the same operating mechanism. With my invention I am enabled to render clutches on two or more independently-pivoted trucks of the car independent of and unaffected by the curves of the road, and it is practicable with my invention to actuate such clutches from a single point by means of a single operating-lever. All this will more fully appear from the following detail description with reference to the accompanying drawings, which illustrates, in—

Figure 1, a plan view of my invention, showing the pivoted trucks in diagram on a straight track with the clutches "on." Fig. 2 is a similar view, but showing a single truck only on a curve of the track with the clutch "on." Fig. 3 is a like view showing two trucks on a straight track with the clutches "off," and Fig. 4 shows a single truck on a curve of the track with the clutch "off."

Like numerals of reference indicate like parts throughout the drawings.

Referring now to Fig. 1, there are presented in diagram or conventionally the front and rear trucks 1 2 of a car supposed to be on a straight track and each supposed to be provided with an electric motor, which is coupled with and uncoupled from the driving-axle by means of a friction-clutch 3. These trucks are pivoted at their centers to the car-body, and the pivots are represented by dotted lines at 4 4. The details of construction of the trucks and the manner of mounting the electric motors thereon and the connection of the clutches with the electric motors and with the driving-axle form no part of my present invention, and are therefore and for the sake of simplicity not illustrated.

The operating-lever under the control of the motorman on the platform of the car is connected by a ball-and-socket joint 5 with a link 6, which extends to the center of the front truck at a point below the pivot 4. At this point 7 the link 6 is pivoted to one arm of a lever 8, which in turn is pivoted to the body of the truck at a point 9. The other end of the lever 8 is slotted, as shown at 10, and the slot receives the end of the clutch-arm 11, which projects from the clutch 3, and which latter may be constructed in a manner shown in my aforesaid Letters Patent or in any other suitable manner.

At the juncture of the link 6 with the lever 8 there is also pivotally connected therewith a connecting-rod 12, which extends to the rear truck 2 to a point 7 below the center of the pivot of the truck, where another lever 8, mounted in the same manner as the lever 8 of the front truck, is pivoted to the end of the connecting-rod 12. The connection between this lever 8 and the clutch 3 on the rear truck may be the same as is shown and has been described with reference to the front truck; but in the drawings I have shown a modified construction. In this instance the outer end of the lever 8 instead of being slotted is provided with a ball-and-socket joint 13, and another ball-and-socket joint 14 is provided at the end of the clutch-arm 11, and there is a link 15, which joins the end of the lever 8 with the end of the clutch-arm by means of these ball-and-socket joints.

In accordance with my invention the relation of the parts is such that when the inner end of the lever 8 in either of the two constructions is practically coincident with the center of the pivot of the truck the clutch is "on," and that by movement of the inner end of the lever 8 in a direction from the front of of the car—that is to say, by a rearward movement of that lever end—the clutch is turned "off." The connecting-rod 12 therefore must be of a length equal to the distance between the centers of the pivots of the two trucks.

From the foregoing description it will now be understood that the motors are clutched to the driving-axles by actuating the link 6, by means of the operating-lever, in the direction of the arrow a, and that they are unclutched by actuating the link 6 in the opposite direction.

Now by reason of the location of the inner end of the lever 8 centrally with reference to the pivot of the truck the relation of that lever to the link 6 and to the clutch-arm 11 remains unchanged if the car enters upon a curve. In Fig. 2 this condition is represented with respect to the front truck, but it will be clear that it is also true with respect to the rear truck. In this figure of drawings the dotted line marks the position of the truck when the same is on a straight track, while the solid lines mark the position of the truck when the car is upon a curve, and it will be clear to those skilled in the art that by such turning of the truck the relation to each other of the lever 8 and clutch-arm 11 remain unchanged and that consequently the clutch is not affected by such turning of the truck. The only thing that is changed by the turning of the truck is the angle formed between the link 6 and the lever 8, which, however, has no effect upon the clutch. If, therefore, the clutches have been applied, the car may pass around any curve without either unclutching the motors or applying the clutch with greater, unnecessary, and injurious force, and it will also be clear that while the car is running upon a curve the clutches may be applied or released in the same manner and with the same ease as though the car were running on a straight track.

In Fig. 3 the two bogie-trucks of a car are represented in positions which they would have when the car is on a straight track, but the operating mechanism is shown shifted to the position in which the clutches are released—that is to say, the link 6 has been moved in the direction of the arrow b, the pivot-points 7 have been moved to the left-hand side of the truck-pivots, and the outer ends of the levers 8 8 have consequently been turned toward the right. By this movement the connecting-rod 12 has also been moved, although very slightly, parallel to its original position toward the sides of the truck on which the clutches are located, the connecting-link 6 has been turned with its inner end also slightly in the direction, in which movement the ball-and-socket joint 5 serves as a pivot. These lateral movements of the connecting-rod 12 and of the link 6 are, however, so small as to be barely perceptible.

In Fig. 4 I have represented the front truck with the clutch released and the car upon a curve. It will be seen that by such turning of the truck the relation of the lever 8 to the clutch-arm 11 is not perceptibly affected and that in fact no change is produced in the position of the operating parts, except that the angle formed between the link 6 and the lever 8 has been decreased. This change of the angle between the lever 8 and link 6 is due to the fact that the lever with the truck turns upon the truck-pivot, while the inner end of the link turns about the ball-and-socket joint 5 as a center. This combined movement does not perceptibly shift the relation of the outer end of the lever 8 to the clutch-arm, but any slight movement of the clutch which might take place has practically no effect upon the clutch, since the same is now "off," and it is therefore of no consequence if it is slightly moved one way or the other. It is therefore clear that with my invention the clutches remain unaffected by the running of the car upon a curve, no matter whether the clutch is in the condition known as "on" or in the condition known as "off."

It will now be understood that the reason why in my invention the clutches are unaffected by the turning of the trucks is that the operating mechanism is pivoted concentrically with the pivot of the truck when the clutch is "on," and that it is pivoted nearly concentric with the pivot of the truck when the clutch is "off." It will also be understood that when the clutch is off it would be perceptibly affected by the turning of the truck if the connection of the link 6 with the actuating-lever were either rigid or only a simple pivot and not a ball-and-socket joint or any other universal joint. In place of the ball-and-socket joint 5 any other connection that will permit a slight movement of the link 6 in the plane defined by that link and by the lever 8 may be substituted, and it is practicable to use a loose pivot connection in place of the ball-and-socket joint.

While my invention is primarily designed for the operation of friction-clutches, it will be evident to those skilled in the art that any other devices for applying power may be controlled in the same manner, so that in place of the clutches 3 there may be electric switches for turning on and off the electric current or for controlling the amount of current admitted, or there may be throttle-valves for controlling the admission of steam or compressed air, &c., so that my invention comprises generally the operation of any devices for applying or controlling power on bogie-truck cars.

Having now fully described my invention, I claim and desire to secure by Letters Patent—

1. The combination of a bogie-truck car, with a clutch for applying power on each truck, and operating mechanism for the same, pivoted at or near the pivots of the trucks and terminating at a single point, whereby it is unaffected by the turning of the trucks, substantially as described.

2. The combination of a bogie-truck car, with a clutch or clutches for applying power to the driving axle or axles, and operating mechanism swiveled at or near the pivots of the trucks whereby it is unaffected by the turning of the said trucks, substantially as described.

3. The combination of a bogie-truck car, with a clutch for applying power to a driving-axle, and operating mechanism for the clutch pivoted concentric with the truck when the clutch is on, and a universal joint between the said mechanism and an operating-lever under the control of an operator, substantially as described.

4. In a bogie-truck car, the combination with a clutch for applying power to the driving-axle, of operating mechanism therefor consisting of a lever connected at one end to the clutch and a link connected to the said lever and extending to a lever under the control of an operator, the connected ends of the link and clutch-lever moving to a point concentric with the truck-pivot when the clutch is applied, substantially as described.

5. In a bogie-truck car, the combination with a clutch for applying power to the driving-axle, of operating mechanism therefor consisting of a lever pivoted to the truck, a link connecting the outer end thereof with the clutch, and another link connecting the inner end of the clutch-lever with an operating-lever under the control of an operator, the said inner end of the clutch-lever moving to a point concentric with the truck-pivot when the clutch is applied, substantially as described.

6. In a bogie-truck car, the combination with two clutches, one for each truck, for applying power to the driving-axles, of operating mechanism therefor consisting of a lever for each clutch and having its outer end connected thereto, a link connecting the inner ends of the clutch-levers, and a link connecting the inner end of one clutch-lever to an operating-lever under the control of an operator, the inner end of each clutch-lever moving to points concentric with the truck-pivots when the clutches are applied, substantially as described.

In testimony whereof I have signed my name to this specification in the presence of two subscribing witnesses.

JAMES F. McLAUGHLIN.

Witnesses:
EDWARD ELDRED,
J. R. RICHARDS.